United States Patent
Yang et al.

(10) Patent No.: US 9,876,881 B2
(45) Date of Patent: Jan. 23, 2018

(54) NODE AND METHOD FOR OBTAINING PRIORITY INFORMATION IN A HEADER OF A CONTROL PLANE MESSAGE

(71) Applicant: Telefonaktiebolaget L M Ericsson (publ), Stockholm (SE)

(72) Inventors: Yong Yang, Kållered (SE); Loudon Lee Campbell, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 136 days.

(21) Appl. No.: 14/899,336

(22) PCT Filed: Jul. 2, 2014

(86) PCT No.: PCT/EP2014/064077
§ 371 (c)(1),
(2) Date: Dec. 17, 2015

(87) PCT Pub. No.: WO2015/003972
PCT Pub. Date: Jan. 15, 2015

(65) Prior Publication Data
US 2016/0156748 A1     Jun. 2, 2016

Related U.S. Application Data

(60) Provisional application No. 61/844,458, filed on Jul. 10, 2013.

(51) Int. Cl.
*H04L 29/06* (2006.01)
*H04W 76/02* (2009.01)
(Continued)

(52) U.S. Cl.
CPC .............. *H04L 69/22* (2013.01); *H04L 47/24* (2013.01); *H04L 47/32* (2013.01);
(Continued)

(58) Field of Classification Search
None
See application file for complete search history.

(56) References Cited

U.S. PATENT DOCUMENTS 8,310,927 B1 * 11/2012 Cohen .................. H04L 12/413
370/231
2009/0016334 A1 * 1/2009 Forsberg ............... H04W 28/06
370/389
(Continued)

FOREIGN PATENT DOCUMENTS

CN   102104971 A    6/2011
EP    2501199 A1    9/2012
(Continued)

OTHER PUBLICATIONS

Author Unknown, "Technical Specification Group Services and System Aspects; Study on Core Network Overload Solutions; (Release 12)," Technical Report 23.843, Version 1.0.0, 3GPP Organizational Partners, Jun. 2013, 43 pages.
(Continued)

*Primary Examiner* — Faruk Hamza
*Assistant Examiner* — Cassandra Decker
(74) *Attorney, Agent, or Firm* — Withrow & Terranova, PLLC

(57) ABSTRACT

Example embodiments presented herein are directed towards a node, and corresponding method, for managing GTP control plane messaging based on priority information provided in the header of the GTP control plane message. By providing the priority information in the header of the GTP control plane message, message processing may be reduced.

13 Claims, 5 Drawing Sheets

(51) Int. Cl.
  *H04L 12/851*  (2013.01)
  *H04L 12/823*  (2013.01)
  *H04W 76/04*  (2009.01)
  *H04W 28/02*  (2009.01)

(52) U.S. Cl.
  CPC ..... *H04W 28/0289* (2013.01); *H04W 76/021* (2013.01); *H04W 76/041* (2013.01)

(56) References Cited

U.S. PATENT DOCUMENTS

2013/0114443 A1*  5/2013  Van Zijst ............. H04L 47/125
                                                      370/252
2016/0112896 A1*  4/2016  Karampatsis ..... H04W 28/0252
                                                      370/230.1

FOREIGN PATENT DOCUMENTS

WO        0010357 A1    2/2000
WO      2010133911 A1   11/2010

OTHER PUBLICATIONS

Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.

Author Unknown, "Technical Specification Group Core Network and Terminals; General Packet Radio Service (GPRS); GPRS Tunnelling Protocol (GTP) across the Gn and Gp interface (Release 12)," Technical Specification 29.060, Version 12.0.0, 3GPP Organizational Partners, Mar. 2013, 176 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274. Version 12.0.0, 3GPP Organizational Partners, Mar. 2013, 228 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.1.0, 3GPP Organizational Partners, Jun. 2013, 228 pages.

International Search Report and Written Opinion for International Patent Application No. PCT/EP2014/064077, dated Jan. 5, 2015, 12 pages.

* cited by examiner

NODE AND METHOD FOR OBTAINING PRIORITY INFORMATION IN A HEADER OF A CONTROL PLANE MESSAGE

This application is a 35 U.S.C. §371 national phase filing of International Application No. PCT/EP2014/064077, filed Jul. 2, 2014, which claims the benefit of U.S. Provisional Application No. 61/844,458, filed Jul. 10, 2013, the disclosures of which are incorporated herein by reference in their entireties.

TECHNICAL FIELD

Example embodiments presented herein are directed towards a core network node, and corresponding methods therein, for obtaining priority information from a header of a General Packet Radio Service (GPRS) Tunneling Protocol (GTP) control plane message.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In communications networks, during peak use hours, overload situations may occur. Overload situations occur when there are high congestion levels in the various nodes in the network. When a network node is overloaded, some incoming messages must be dropped or rejected. In order to attempt to relieve such overload situations, different priority levels may be assigned to different types of communications or users. Thus, if it is not possible to handle all incoming communications, communications with comprise a higher priority may be processed first. Therefore, higher prioritized communications are likely to be processed and lower prioritized communications are more likely to be dropped or rejected, if needed due to congestion.

SUMMARY

To mitigate overload situations when a node is about to become overloaded due to a high volume of incoming signaling messages, the node should be able to prioritize some signaling messages associated with certain user equipments or wireless terminals, PDN connection(s), and/or bearer context(s), to ensure the service continuity for those more important wireless terminals and/or services. With existing requirements in 3GPP, a receiving GTPv2 entity has the ability to use, for example, APN, QCI and ARP to make such prioritization discrimination, but such parameters exist only in the content of GTPv2 messages and such logic is then typically handled at the application layer not at the GTPv2 transaction layer. Handling at the GTPv2 transaction layer results in the receiver having to parse the complete received GTPv2 message and parse, at least partly, all IEs until it reaches these fields in the message. Such parsing may be required since IEs may be in any order in GTPv2. IEs are forwarded to application layers, for example, mobility management, or session management, where it is possible to decide if the received GTPv2 message should be further processed or dropped. This is very inefficient as the GTP transaction layer, which is for handling/dispatching the received GTPv2 messages, is often the bottleneck for the signaling processing.

Furthermore, for complex signaling procedures, for example S1 based handover procedures, a failed signaling step may require the entire procedure starting over. This is especially critical in an overload situation where signaling traffic to the network will be increased.

Thus, a more efficient means of determining a priority level is needed. Accordingly, at least one example object of some of the example embodiments presented herein is to provide an effective means of prioritizing communications without the need of complex processing. Thus, some of the example embodiments provided herein are directed towards protocol enhancement where priority information may be provided in the header of a GTP control plane message. As such information is provided directly in the header of the GTP control plane message; there is no need for further processing in order to determine a communication priority.

It should be appreciated that the example embodiments presented herein may be utilized for any form of wireless communications. Furthermore, the example embodiments presented herein may be utilized between communications of any two nodes within the wireless communications network. It should further be appreciated that such a means is not easily provided by simply prioritizing different types of messages. For example, different message types may not be directly associated with the importance of the message. Specifically, a Modify Bearer Request message over S5/S8 may not be important if it is used for providing ULI, while the same message may be important during inter SGW mobility scenarios. Hence, the GTPv2 command/message code is not sufficient on its own.

At least one example advantage of some of the example embodiments presented herein is the ability to improve the efficiency of GTPv2 message processing, especially during an overload situation. The example embodiments allow a receiver node to identify the importance of the GTPv2 message without looking into the content of the message. Rejection of the message may be performed at the GTPv2 transaction layer. Therefore, there is no load on the application layer for dropped/rejected messages or even before reaching the GTPv2 transaction layer in a board handling discrimination/routing/dispatching to a CPU/board in a multi-CPU/board node.

A further example advantage of the some of the example embodiments presented herein is the ability to greatly improve the efficiency of GTPv2 message handling. Furthermore, the example embodiments presented herein utilize existing messages. Thus, a further example advantage is providing an efficient means of priority determination without the use of extra signaling. It should also be appreciated that the example embodiments are fully backward compatible with respect to different types of legacy networks.

Some of the example embodiments are directed towards a method, in a first core network node, for determining priority information for communications received by the first core network node. The method comprises receiving, from a second core network node, a GTP control plane message. The method further comprises retrieving priority information from a header of the GTP control plane message. The method also comprises managing the GTP control plane message based on the received priority information. The managing of the GTP control plane message further comprises further processing, dropping, buffering or rejecting the GTP control plane message.

Some of the example embodiments are directed towards a first core network node for determining a priority level for communications received by the first core network node. The first core network node comprises radio circuitry configured to receive, from a second core network node, a GTP control plane message. The first core network node further comprises processing circuitry configured to retrieve priority information from a header of the GTP control plane message. The processing circuitry is further configured to manage the GTP control plane message based on the received priority information. The management of the GTP control plane message comprises further processing, dropping, buffering or rejecting the GTP control plane message.

DEFINITIONS

3GPP Third Generation Partnership Project
APN Access Point Name
ARP Allocation and Retention Priority
AS Application Server
BSC Base Station Controller
CN Core Network
CPU Control Processing Unit
DNS Domain Name System
E-UTRAN Evolved Universal Terrestrial Radio Access Network
  eNodeB Evolved NodeB
  EPC Evolved Packet Core
  ePDG Evolved Packet Data Gateway
  F-TEID Fully Qualified TEID
  FFS For Further Study
GERAN GSM/EDGE Radio Access Network
GGSN Gateway GPRS Support Node
GPRS General Packet Radio Service
GSM Global System for Mobile Communications
GTP GPRS Tunneling Protocol
GTP-C GTP Control Plane
GW Gateway
HLR Home Location Register
HSS Home Subscriber Server
IE Information Element
IMS Internet Protocol Multimedia Subsystem
IMSI International Mobile Subscriber Identity
LTE Long Term Evolution
MBR Maximum Bit Rate
MME Mobility Management Entity
PCRF Policy Control and Charging Rules Function
PDN Packet Data Network
PGW PDN Gateway
QCI QoS Class Identifier
RAN Radio Access Network
RAU Routing Area Update
RBS Radio Base Station
RNC Radio Network Controller
SCS Service Capability Server
SGSN Serving GPRS Support Node
SGW Serving Gateway
SIP Session Initiation Protocol
TA Tracking Area
TAU Tracking Area Update
TEID Tunneling End Identity
TWAN Trusted WLAN Access Network
UE User Equipment
ULI User Location Information
UMTS Universal Mobile Telecommunications System
UTRAN UMTS Terrestrial Radio Access Network
WCDMA Wideband Code Division Multiple Access
WiFi Wireless Fidelity
WLAN Wireless Local Area Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN, E-UTRAN, Wi-Fi based system.

General Overview

Figure 1:
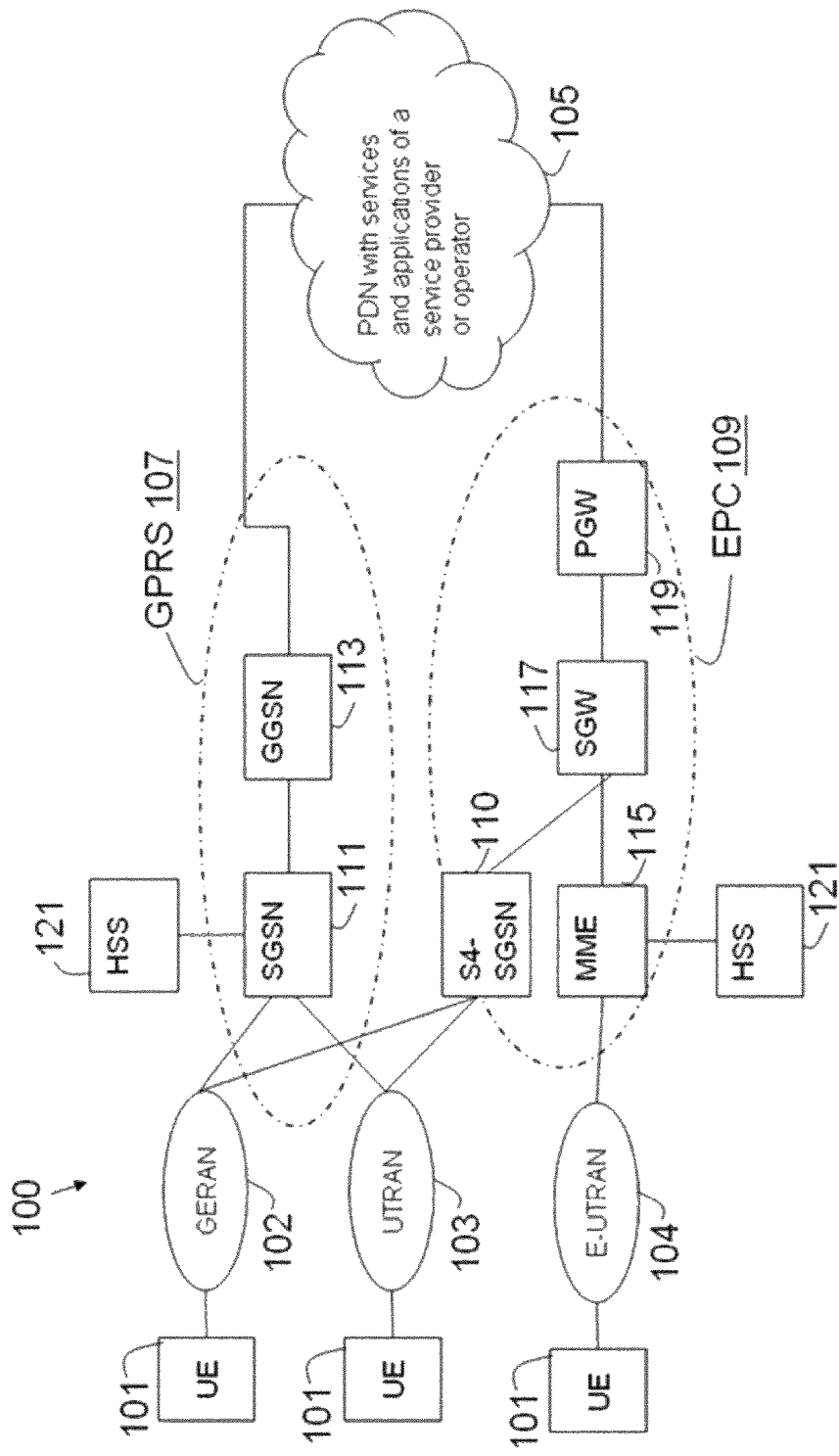
FIG. 1 is an illustrative example of a wireless network.

In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

In communications networks, during peak use hours, overload situations may occur. Overload situations occur when there are high congestion levels in the various nodes in the network. When a network node is overloaded, some incoming messages must be dropped or rejected. The more CPU time spend on parsing dropped or rejected messages the less CPU time is available to handle successful messages. In order to attempt to relieve such overload situations, different priority levels may be assigned to different types of communications or users. Thus, if it is not possible to handle all incoming communications, communications which comprise a higher priority may be processed first. Therefore, higher prioritized communications are likely to be processed and lower prioritized communications are more likely to be dropped or rejected if needed due to congestion.

3GPP has started a new technical study, the Core Network Overload study (TR 23.843), which aims to:

1. Identify and document events that have occurred and caused network disturbances due to signalling overload. In addition, identify and document scenarios that have high probability of occurrence in the 3GPP network, which may result in signalling overload for core network entities. Such scenarios/events may include HLR/HSS overload by RNC restart, denial of service attacks, and misbehaving/3GPP-non-compliant mobiles causing unpredictable system response;

2. Analyse the criticality of the scenarios and determine whether it is required to take actions for the identified scenarios; and 3. Study ways to mitigate and/or eliminate the impact on the core network from signalling overload scenarios that are identified to be critical.

Some scenarios have been identified in TR 23.843, *"Scenario 8: GTP-C Overload due to flood of Mobility and Session Management messages"*. The following different mobility and session management scenarios may cause GTP-C overload (TR 23.843):

1. Frequent Idle Connected, and Connected Idle transitions cause due to, for example, an eNB idle timer. Depending on the value of eNB idle timers, which may result in large number of, for example, SERVICE REQUESTs from UEs in a busy hour, session overload may occur in either an SGW managing TA/TAs or a set of SGWs managing TAs.

2. Large number of users performing TAU/RAU. In a typical network deployment, the number of MMEs and SGWs is considerably large(r) than the number of PGWs. In densely populated areas mass transit systems transfer a large number of users on a daily basis. This results in a large number of simultaneous TAUs/RAUs towards MMEs/SGSNs and corresponding Modify Bearer Requests towards SGWs. This may result in large number of MBRs towards a single or very few PGWs.

3. An overload of a downstream node, for example, a PGW, may also potentially cause overload of an upstream node, for example, a SGW, which may be due to GTP-C signaling retransmissions.

4. At the failure of an EPC node, for example, a SGW, where the network would try to re-establish the GTP-C session via a new EPC node (SGW) that would replace the failing one. The risk is that the failure of a node, for example, a SGW, would trigger a spike in GTP-C signaling to restore the PDN connections affected by the failure. These attempts to restore PDN connections affected by the failure would overflow other nodes, for example, other SGW and PGW nodes, and transform a local failure, for example, of an SGW, into a complete network issue via a snow ball effect. The same applies upon a failure of a PGW, MME or SGSN.

5. At overload or failure of a GTP-C node, for example, a SGW, where the network would need to establish subsequent, or new, GTP-C sessions via a smaller number of GTP-C nodes, for example, using only other SGW of the same cluster. The risk is that the overload/failure of a node, for example, a SGW, would trigger an increase of GTP-C signaling that would overflow other nodes, for example, other SGW of the same cluster, and transform a local failure, of an SGW, into a complete network issue via a snow ball effect.

6. A GTP-C node, for example, a PGW, may encounter issues to handle traffic on a non-overloaded GTP-C interface, for example, a S5 interface, when another of its, possibly non GTP-C, interfaces, for example, Gx, is overloaded.

7. Application signaling that induces creation of dedicated bearers served by a MME or pool of MMEs. A large number of users may start application related interactions, for example, an IMS SIP call, simultaneously when some exceptional event occurs, which leads to a large amount of almost simultaneous Create/Update Bearer Requests sent from PGW to MME.

Given the nature of the GTP-C protocol in how it relies on retransmissions of unacknowledged requests, when a GTP-C node experiences overload, the number of unacknowledged GTP-C messages compounds exponentially especially in case of congestion. The larger the number of users on an operator's network, the worse the problem becomes. Therefore, mechanisms to detect, and mitigate overload on the GTP Control plane shall be investigated. Current GTP-C load balancing relies on the MME using DNS weights that are semi-static and "typically set according to the capacity of a GW node relative to other GW nodes" (see 3GPP TS 23.401) but that do not take into account the instantaneous load or capacity of the GWs. Assuming that all xGW have the same capacity and are associated with the same semi-static load factors, when there is no network failure, such schema allows an even share of the PDN connections between the xGW.

According to one example, an xGW node has a partial failure, for example, one of the node's components has failed, or during certain maintenance operations, it may still be working but not with the full capacity. In this case, the DNS weights associated with this node become stale or comprise wrong information.

According to another example, when an xGW has failed, all its traffic is "handed-over" to other xGW. Thus, these other xGW support a higher amount of load than usual. When the failed xGW restarts or recovers, the traffic allocation, based on even DNS weights, allocates the same amount of traffic to the various xGW, even though the recovering xGW is not loaded while the other xGW support a higher amount of load than usual. The same applies during network extensions, for example, when adding a new SGW to an SGW cluster.

A further example is once the load is un-balanced for any of the reasons provided above, overload may be experienced in one or more nodes of a xGW cluster while there is still remaining capacity on other nodes of the same cluster, leading to GTP-C retransmissions, potential re-attempts via an alternative node, failures.

As should be appreciated from the above, quite a few network scenarios may lead to signaling overload over different GTP interfaces. The suggested solutions for these overload scenarios may either be (1) to avoid CN overload, for example, via load re-balance, or signaling optimization; or (2) to mitigate overload situation when a node is about to be overloaded.

To mitigate overload situations caused by a node being overloaded due to a high volume of incoming signaling messages, the node which is about to be overloaded should be able to prioritize some signaling messages associated with certain user equipments or wireless terminals, PDN connection(s), and/or bearer context(s). With existing requirements in 3GPP, a receiving GTPv2 entity has the ability to use, for example, APN, QCI and ARP to make such prioritization discrimination, but such parameters exist only in the content of GTPv2 messages and such logic is typically handled at the application layer not at the GTPv2 transaction layer. Handling at the GTPv2 transaction layer results in the receiver having to parse the received GTPv2 message and parse, at least partly, all IEs until it reaches these fields in the message. Such parsing may be required since IEs may be in any order in GTPv2. IEs are forwarded to application layers, for example, mobility management, or session management, where it is possible to decide if the received GTPv2 message should be further processed or dropped. This is very much inefficient as the GTP transaction layer, which is for handling/dispatching the received GTPv2 messages, is often the bottleneck for the signaling processing.

Furthermore, for complex signaling procedures, for example S1 based handover procedures, a failed signaling step may lead to a need of the entire procedure starting over. This is especially critical in an overload situation where signaling traffic to the network will be increased.

Overview of the Example Embodiments

A more efficient means of determining a priority level is needed. Accordingly, some of the example embodiments provided herein are directed towards protocol enchantment where priority information may be provided in the header of a GTP control plane message. As such information is provided directly in the header of the GTP control plane message; there is no need for further processing in order to determine a communication priority. According to some of the example embodiments, the priority information may be comprised in a TEID or a sequence number.

It should be appreciated that the example embodiments presented herein may be utilized for any form of wireless communications. Furthermore, the example embodiments presented herein may be utilized between communications of any two nodes within the wireless communications network. It should also be appreciated that such a means is not easily provided by simply prioritizing different types of messages. For example, different message types may not be directly associated with the importance of the message. Specifically, a Modify Bearer Request message over S5/S8 may not be important if it is used for providing ULI, while the same message may be important during inter SGW mobility scenarios. Hence, the GTPv2 command/message code is not sufficient on its own.

Thus, any type of GTP control plane message may be utilized according to the example embodiments presented herein. The priority information may be provided in a GTP control plane message during any type of mobility or attach procedure associated with a wireless terminal. According to some of the example embodiments, the priority information within the header of the GTP control message may be in the form of a TEID or a sequence number.

According to some of the example embodiments, a protocol enhancement is provided such that it is applicable for all GTPv2 interface and the GTPv2 entities. In addition, the example embodiments may extend to cover GTPv1. For GTPv1, it is not possible to use the flag in the header to indicate the allocated TEID or sequence number whether the priority information is embedded (as will be described below in greater detail), however alternative approaches work.

The example embodiments described herein provide a mechanism to use the GTP header to indicate the priority per UE/PDN connection/GTP transaction to the receiving GTP entity, to allow the receiver to have different handling. Such different handling options may be useful as further parsing of the received GTP messages will not be needed.

As stated previously, it is very inefficient that the receiving node has to parse the received GTP signaling message and send to application layer to be able to prioritize and decide further actions, for example, reject or drop the message, especially during an overload situation. Thus, the example embodiments provided herein propose to use bits in the GTP header which has major benefits. The header is in a fixed position at top of the message. So the IEs in the message need not be parsed at all to determine if the message is to be dropped or rejected. The GTP transaction layer may handle the rejection, hence no CPU time at all is required in the application layer of the overloaded node to handle messages that are to be dropped or rejected.

Priority Information Provided Via the TEID

According to some of the example embodiments, the priority information may be provided via the TEID. Using bits in the TEID has an advantage such that in a multi-CPU node, the TEID is often used to route a message to a particular node. In such architectures, the GTP TEID is actually commonly handled in a hardware router board, sometimes called discrimination and routing or dispatching, so the dropping may be done even earlier, for example, during the GTP packet routing inside the overloaded node.

According to some of the example embodiments, a new flag or cause code is provided in the GTPv2 header, the flag is herein referred to as "TEID Flag" which indicates that the allocated Tunneling Endpoint Identifier on the control plane embeds the priority information for given PDN connection (e.g. for S5/S8), or for user equipment or wireless terminal (e.g. S11/S4, S10/S16/S3 where all the PDN connections are sharing the same TEID on the control plane).

Alternatively, the proposed flag may be provided in the message which is used to establish/update the GTP control plane tunnel, for example, in the GTPv2 Create Session Request/response message, Modify Bearer Request message (e.g., over S11/S4 during inter MME and intra SGW mobility procedures or over S5/S8 during inter SGW mobility procedures).

As another alternative, the GTP entity may embed priority information in its allocated TEID on the control plane if the sender and receiver have confirmed the support of this mechanism, by using the mechanism "Notification of supported features between peer GTP-C entities" as specified in TS 29.274, chapter 11.

If the flag is provided, for example, set to 1, this means allocated TEID provided in the Sender F-TEID embeds priority information. The TEID is 4 Octets, so it is possible to use a few most/least significant bits to provide priority information. The number of bits and the position of bits in the TEID in the header may be standardized or dynamically exchanged via the mechanism "Notification of supported features between peer GTP-C entities" as specified in TS 29.274, chapter 11. Such setting of priority information may be based on operator policies, for example, APN, QCI, ARP and other applicable parameters, e.g., user equipment subscription related parameters. So the receiver may easily know with which is the priority of this UE/PDN connection the message is associated with by reading the GTPv2 header, so no need to further parse the GTP message. Note that the TEID in the header, when it is not zero, was allocated by the receiver earlier.

Figure 2:
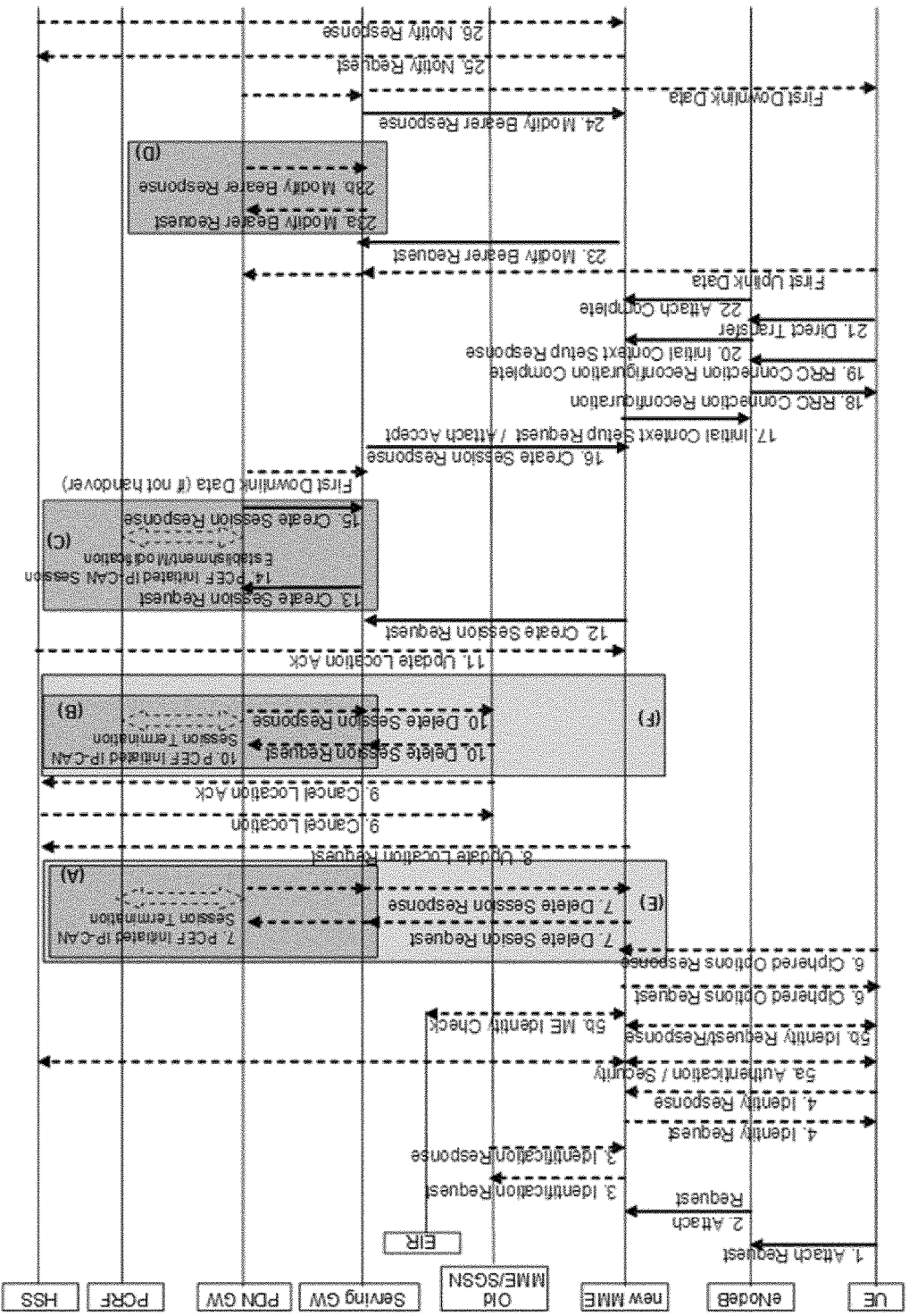
FIG. 2 is an example of a message passing diagram depicting some features of the example embodiments presented herein.

FIG. 2 illustrates the impact of some of the example embodiments on the signalling procedures, for example, an E-UTRAN initial attach procedure. In FIG. 2, messages 1-11 are as is specified in TS 23.401, chapter 5.3.2.1.

According to some of the example embodiments, the new MME is configured to send a Create Session Request to the SGW (message 12). In the Create Session Request message sent from the MME to the SGW, the MME is configured to set a "TEID Flag" in the GTPv2 header or set a "TEID FLAG" in the Indication Flags IE to indicate the Sender F-TEID for Control Plane comprises priority information for the UE. It should be appreciated that TEID on the control plane for S11/S4 interface is per UE. At the same time, the MME shall embed such priority information in the Sender F-TEID for Control Plane. In addition, the MME may set "sequence number flag" to indicate the sequence number included in GTPv2 header contains priority information for this GTP transaction.

According to some of the example embodiments, the SGW in turn sends a Create Session Request to a PGW (message 13). In the Create Session Request message sent from the SGW to the PGW, the SGW should set a "TEID Flag" in the GTPv2 header or set a "TEID FLAG" in the Indication Flags IE to indicate the Sender F-TEID for Control Plane comprises priority information for the PDN Connection. The SGW may use the same priority information provided by the MME and set it accordingly in the Sender F-TEID for Control Plane for the PGW, or the SGW may set the priority with a different value. In addition, the SGW set "sequence number flag" to indicate the sequence number included in GTPv2 header contains priority information for this GTP transaction. Thereafter, a PCEF initiated IP-CAN session Establishment/Modification between the PGW and the PCRF will take place (message 14).

According to some of the example embodiments, the PGW is configured to send a Create Session Response to the SGW (message 15). In the Create Session Response message sent from the PGW to the SGW, the PGW should set a "TEID Flag" in the GTPv2 header or set a "TEID FLAG" in the Indication Flags IE to indicate the Sender F-TEID for Control Plane contains priority information for the PDN Connection. The PGW may use the same priority information provided by the SGW and set it accordingly in the Sender F-TEID for Control Plane for the SGW, or the PGW may set the priority with a different value.

According to some of the example embodiments, the SGW may be configured to send a Create Session Response to the new MME (message 16). In the Create Session Response message sent from SGW to the MME, the SGW should set "TEID Flag" in the GTPv2 header or set "TEID FLAG" in the Indication Flags IE to indicate the Sender F-TEID for Control Plane contains priority information for the PDN Connection. The SGW may use the same priority information provided by the PGW and set it accordingly in the Sender F-TEID for Control Plane for the MME, or the SGW may set the priority with a different value. Messages 17-22 are as is specified in TS 23.401, chapter 5.3.2.1.

According to some of the example embodiments, the new MME is configured to send a Modify Bearer request message to the SGW (message 23). The Modify Bearer Request message, "TEID flag" is not applicable as the GTP tunnel for the control plane has been exchanged and established. However, the MME and SGW, if the Modify Bearer Request over S5/S8 is applicable, should set a "sequence number flag" in the GTPv2 header and allocate sequence number with embedded priority information, which may be higher than the one for above Create Session Request message. Messages 24-26 are as is specified in TS 23.401, chapter 5.3.2.1.

Priority Information Provided Via the Sequence Number

According to some of the example embodiments, the priority information may also be provided in the sequence number. Thus, the priority information in the sequence number indicates the priority of the individual GTPv2 transaction, for example, Modify Bearer Request for ULI, Modify Bearer Request for handover, etc.

According to some of the example embodiments, a new flag or cause code may be added to the GTPv2 header indicating the allocated sequence number embeds priority information so the receiver may use this priority information to decide how to handle the GTP transaction. Sequence numbers in GTPv2 are 3 Octets, the sender who is initiating a GTP transaction, once setting a flag to provide an indication of the priority information, may use a few most/least significant bits to set the priority of this GTP transaction according to the operator's policies. For example, the GTP transaction (Modify Bearer Request) to update the SGW F-TEID to a PGW during an inter SGW relocation procedure may be of more importance than the GTP transaction (Modify Bearer Request) to update a PGW with UE ULI. As another example, during the GTP transaction to create a dedicated bearer, the PGW may map authorized QCI/ARP from the PCRF to set the priority information in the sequence number in the GTPv2 header of the Create Bearer Request message. It should be appreciated that the number of bits and position of bits that denoting the priority information in the sequence number which may be required may be standardized or dynamically exchanged via the mechanism "Notification of supported features between peer GTP-C entities" as specified in TS 29.274, chapter 11.

According to some of the example embodiments, the sender may embed the priority information in the allocated sequence number if the sender and receiver have confirmed support of this mechanism using the mechanism "Notification of supported features between peer GTP-C entities" as specified in TS 29.274, chapter 11., i.e. the sender embeds priority information in the allocated sequence number and the receiver may extract such priority information and make use of it to deal with a specific GTP transaction.

Working Example

Figure 3:
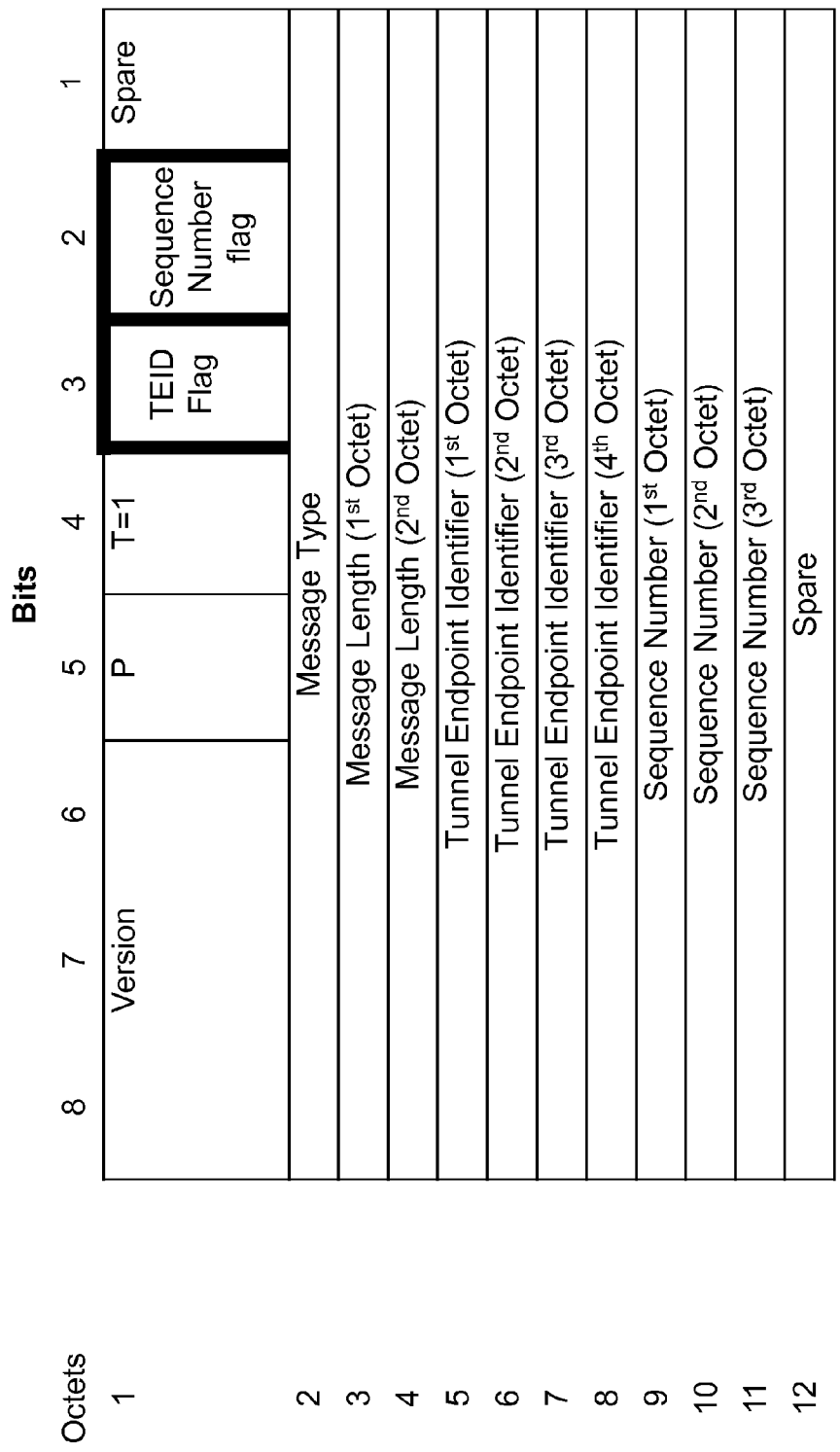
FIG. 3 is an illustrative example of a GTP control plane header, according to some of the example embodiments.

FIG. 3 illustrates a non-limiting working example of a GTP control plane message according to some of the example embodiments, wherein the portions of the message that may be affected by the example embodiments are highlighted with a bold border.

Apart from the Echo Request, Echo Response and Version Not Supported Indication messages, the GTP-C message header may comprise the TEID and sequence number fields followed by one spare octet. A typical GTP-C header is depicted in FIG. 3. The spare bits shall be set to zero by the sender and ignored by the receiver.

According to some of the example embodiments, the TEID flag may be provided in the GTPv2 header. According to some of the example embodiments, the TEID flag may be comprised in an information element in the messages to establish GTP control plane path, for example, using Indication Flags IE in the Create Session Request message. According to some of the example embodiments, the sequence number flag may be provided in the GTPv2 header.

It should be appreciated that the example embodiments described herein may be applied to any communications message or request between any two core network nodes.

Example Node Configurations

Figure 4:
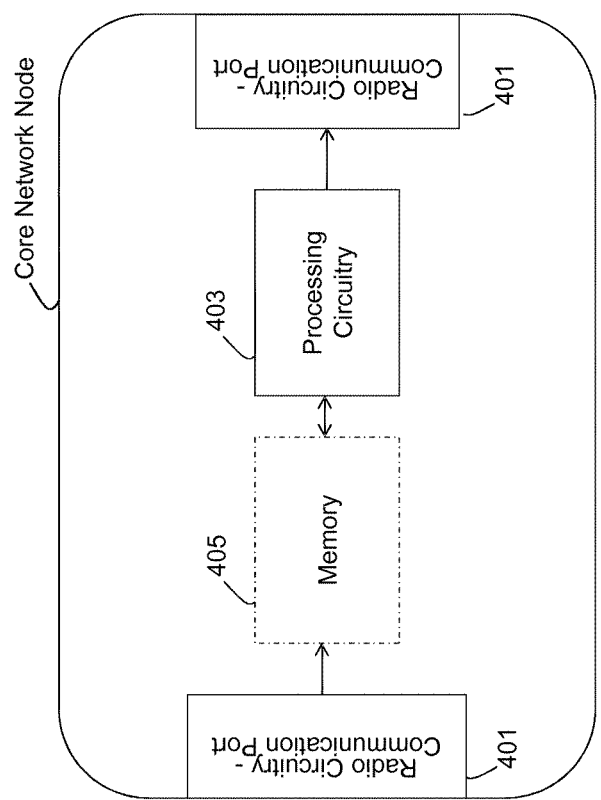
FIG. 4 is an illustration of a core network node configuration, according to some of the example embodiments.

FIG. 4 illustrates an example node configuration of a core network node. It should be appreciated that a core network node may be a MME, SGW, PGW, TWAN, ePDG, GGSN, SGSN, or S4-SGSN. The core network node may perform some of the example embodiments described herein. The core network node may comprise radio circuitry or a communication port 401 that may be configured to receive and/or transmit communication data, instructions, and/or messages. It should be appreciated that the radio circuitry or communication port 401 may be comprised as any number of transceiving, receiving, and/or transmitting units or circuitry. It should further be appreciated that the radio circuitry or communication 401 may be in the form of any input or output communications port known in the art. The radio circuitry or communication 401 may comprise RF circuitry and baseband processing circuitry (not shown).

The core network node may also comprise a processing unit or circuitry 403 which may be configured to provide and retrieve priority information as described herein. The processing circuitry 403 may be any suitable type of computation unit, for example, a microprocessor, digital signal processor (DSP), field programmable gate array (FPGA), or application specific integrated circuit (ASIC), or any other form of circuitry. The core network node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Example Node Operations

Figure 5:
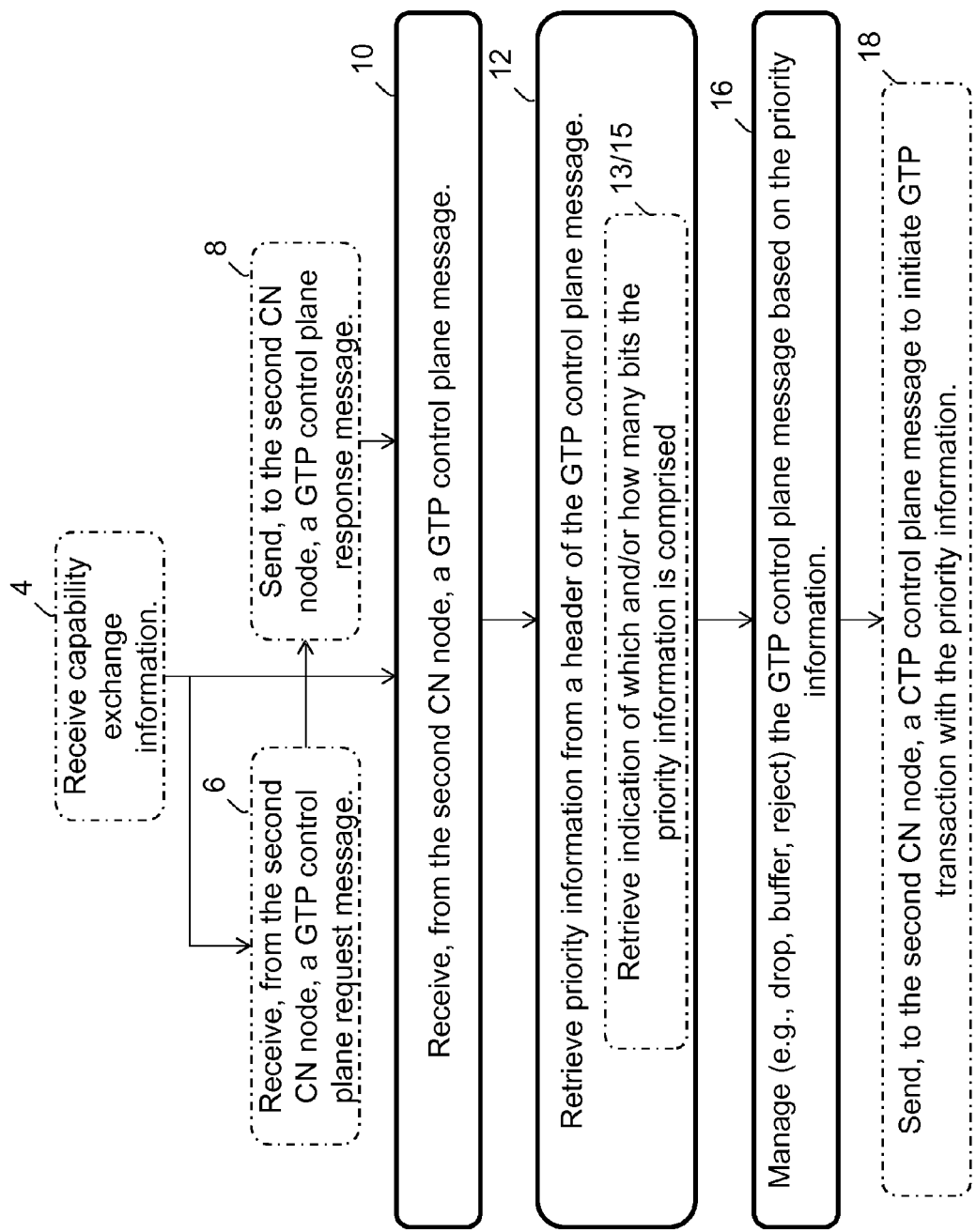
FIG. 5 is a flow diagram depicting example operations performed by the core network node of FIG. 4, according to some of the example embodiments.

FIG. 5 is a flow diagram depicting example operations which may be taken by a core network node as described herein for determining priority information as described herein. Specifically, the example operations are directed towards GTP control plane messaging between a first and second core network node. It should also be appreciated that FIG. 5 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

It should be appreciated that the example operations are not limited to any form of procedure or messaging. The example embodiments may be applied to all communications involving GTP control plane messages between any two network nodes, where priority information is provided in a header of the GTP control plane message in the form of a TEID or a sequence number. Examples of the first and second core network node may be a It should be appreciated that the first core network node may be a MME, SGW, PGW, TWAN, ePDG, GGSN, SGSN, or S4-SGSN.

It should further be appreciated that the example embodiments illustrated in the solid border are applicable to both the TEID and sequence number embodiment discussed herein. It should also be appreciated that example operation 4 is applicable to both the TEID and sequence number embodiment. Example operations 6 and 8 are applicable to the TEID embodiment, while example operation 16 is applicable to the sequence number embodiment. The example operations are further described in at least the non-limiting summary of example embodiments.

Example Operation 4

According to some of the example embodiments, the first core network node may be configured to retrieve 4 capability exchange information indicating a support for receiving priority information in the header of a GTP control plane message. The processing circuitry 403 is configured to retrieve the capability exchange information indicating the support for receiving the priority information in the header of the GTP control plane message.

According to some of the example embodiments, such capability exchange information may be useful such that the first core network node may be informed whether or not the second core network node is capable of providing priority information in the header of a GTP control plane message.

Example Operation 6

According to some of the example embodiments, priority information comprised within the header of a GTP control plane message may be denoted by at least one bit within a TEID. According to such example embodiments, when the first core network node and the second core network node communication to establish a GTP control path with respect to a wireless terminal, the first core network node may be configured to receive 6, from the second core network node, a GTP control plane request message. The GTP control plane request message comprises an indication that priority information mapped by the second core network node is provided in a TEID in the GTP control plane request message. The processing circuitry 403 may be configured to receive, from the second core network node, the GTP control plane request message.

It should be appreciated that any other form of indication may be utilized apart from a TEID flag. It should further be appreciated that an indication that the GTP control plan message comprises priority information in a TEID may be comprised in the header or message portion of the received GTP control plane request message.

Example Operation 8

According to some of the example embodiments, upon the receiving 6, the first core network node may be further configured to send 8, to the second core network node, a GTP control plane response message comprising the TEID embedded with the priority information provided by the second core network node, a TEID flag in the GTP control plane response message and a TEID embedded with the priority information allocated by the first core network node in the GTP control plane response message. The radio circuitry 401 is configured to send, to the second core network node, the GTP control plane response message.

It should be appreciated that the TEID flag may also be provided in the header or message portion of the GTP control plane response message in order to indicate to the second core network node that the priority information associated with the first core network node is provided in the message portion of the GTP control response message. It should further be appreciated that the receiving of example operation 6 and the sending of example operation 8 may occur after any mobility or attach procedure of the wireless terminal. Specifically, such operations may occur when two core network nodes are in communication for the first time to establish the GTP control path for a particular wireless terminal or to start a new procedure for such a terminal.

Operation 10

The first core network node is further configured to receive 10, from the second core network node, the GTP control plane message. The radio circuitry 401 is configured to receive, from the second core network node, the GTP control plane message.

It should be appreciated that the example embodiments may be applied between any two core network nodes, for example, a MME, SGW, PGW, TWAN, ePDG, GGSN, SGSN, or S4-SGSN. Furthermore, the GTP control plane message may be any message or request which may be transmitted between two core network nodes.

Operation 12

The first core network node is further configured to retrieve 12 priority information from a header of the GTP control plane message. The processing circuitry 403 is configured to retrieve the priority information from the GTP control plane message.

According to some of the example embodiments, the priority information may be retrieved from the TEID or sequence number of the header of the GTP control plane message. In the case that the priority information is provided in a TEID, the priority information has been previously allocated by the first core network node as described in examples operations 6 and 8. In the case that the priority information is provided in a sequence number, the priority information is allocated by the second core network node and retrieved by the first core network node as will be described in relation to example operation 15.

According to some of the example embodiments, the priority information may be mapped from an APN, QCI, ARP associated with a PDN connection, wireless terminal subscription related parameters and/or a type of signaling procedure.

Example Operation 13

According to some of the example embodiments, in which the priority information comprised within the header of the GTP control plane message is be denoted by at least one bit within a TEID, the retrieving 12 further comprises retrieving 13, from the capability exchange information described in relation to example operation 4, an indication of which bit(s), and/or how many bit(s), of the TEID the priority information is comprised in. The processing circuitry 403 is configured to retrieve, from the capability exchange information described in relation to example operation 4, the indication of which bit(s), and/or how many bit(s), of the TEID the priority information is comprised in.

Example Operation 15

According to some of the example embodiments, the priority information is denoted by at least one bit within a sequence number. In such embodiments, the retrieving 12 may further comprise retrieving 15, from the capability exchange information described in relation to example operation 4, an indication of which bit(s) and/or how many bit(s) in the sequence number the priority information is comprised in. The processing circuitry 403 is configured to retrieve, from the capability exchange information described in relation to example operation 4, the indication of which bit(s) and/or how many bit(s) in the sequence number the priority information is comprised in.

According to some of the example embodiments, a flag may be comprised in the received GTP control plane message described in relation to example operation 10. The flag may indicate the presence of priority information in at least one bit of the sequence number. It should be appreciated that the flag may be comprised in either the header or message portion of the received GTP control plane message. Furthermore, it should be appreciated that any other forms of indication may be utilized, for example, a cause code.

Operation 16

The first core network node is further configured to manage 16 the GTP control plane message based on the retrieved priority information. The managing 16 comprises the processing, dropping, buffering or rejecting of the GTP control plane message. The processing circuitry 403 is configured to manage the GTP control plane message.

Thus, based on the priority information provided in the header of the GTP control plane message, the first core network node may determine the management of any processing associated with the GTP control plane message.

Example Operation 18

According to some of the example embodiments, the first core network node is further configured to send 18, to the second core network node, a GTP control plane message to initiate a GTP transaction with the priority information provided in at least one bit of a sequence number provided in the header of the GTP control plane message. The radio circuitry 401 is configured to send, to the second core network node, the GTP control plane message to initiate the GTP transaction with the priority information provided in the at least one bit of the sequence number provided in the header of the GTP control plane message.

According to some of the example embodiments, it is the first core network node which allocates the priority information in the GTP control plane messaging between the first and second core network node. Upon, upon receiving the GTP control plane message of example operation 10, which may be a request message, the first network node will initiate the process associated with the request message. The initiation of the GTP transaction will comprise a GTP control plane message featuring the priority information retrieved in example operations 12 and 15.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a first core network node, for managing a General Packet Radio Service Tunneling Protocol, GTP, control plane message based on priority information, the method comprising:

receiving, from a second core network node, the GTP control plane message;

retrieving the priority information from a header of the GTP control plane message, wherein the priority information is denoted by at least one bit within a Tunneling Endpoint Identifier, TEID, and the retrieving further comprises retrieving from capability exchange information an indication of which bit(s), and/or how many bit(s), of the TEID the priority information is comprised in; and managing the GTP control plane message based on the retrieved priority information, wherein said managing further comprises further processing, dropping, buffering or rejecting the GTP control plane message.

2. The method of claim 1, further comprising receiving capability exchange information indicating a support for receiving the priority information in the header of the GTP control plane message.

3. The method of claim 1, when the first core network node and the second core network node communicate to establish a GTP control path with respect to a wireless terminal the method further comprising:
receiving, from the second core network node, a GTP control plane request message that is separate from the GTP control plane message, said GTP control plane request message comprising an indication that the priority information mapped by the second core network node is provided in the TEID in the GTP control plane request message; and
sending, to the second core network node, a GTP control plane response message comprising the TEID embedded with the priority information provided by the second core network node and an indication in the GTP control plane response message that a TEID embedded with the priority information allocated by the first core network node is in the GTP control plane response message.

4. The method of claim 1, wherein the priority information is mapped from an access point name, APN; quality of service class identifier, QCI; allocation retention priority, ARP, associated with a packet data network, PDN, connection; wireless terminal subscription related parameters; and/or a type of signaling procedure.

5. A first core network node for managing a General Packet Radio Service Tunneling Protocol, GTP, control plane message based on priority information, the first core network node comprising:
radio circuitry configured to receive, from a second core network node, the GTP control plane message;
processing circuitry configured to retrieve the priority information from a header of the GTP control plane message, wherein the priority information is denoted by at least one bit within a Tunneling Endpoint Identifier, TEID;
the processing circuitry further configured to retrieve from capability exchange procedure information an indication of which bit(s) and/or how many bits of the TEID the priority information is comprised in; and
the processing circuitry further configured to process, drop, buffer or reject the GTP control plane message based on the retrieved priority information.

6. The first core network node of claim 5, wherein the radio circuitry is further configured to receive capability exchange information indicating a support for receiving the priority information in the header of the GTP control plane message.

7. The first core network node of claim 5, when the first core network node and the second core network node communicate to establish a GTP control path with respect to a wireless terminal, where:
the radio circuitry is further configured to receive, from the second core network node, a GTP control plane request message that is separate from the GTP control plane message, said GTP control plane request message comprising an indication that the priority information mapped by the second core network node is provided in the TEID which is provided in the GTP control plane request message; and
the radio circuitry is further configured to send, to the second core network node, a GTP control plane response message comprising the TEID embedded with the priority information provided by the second core network node and an indication in the GTP control plane response message that the TEID embedded with the priority information allocated by the first core network node is in the GTP control plane response message.

8. The first core network node of claim 5, wherein the priority information is mapped from an access point name, APN; quality of service class identifier, QCI; allocation retention priority, ARP, associated with a packet data network, PDN, connection wireless terminal subscription related parameters; and/or a type of signaling procedure.

9. A method, in a first core network node, for managing a General Packet Radio Service Tunneling Protocol, GTP, control plane message based on priority information, the method comprising:
receiving, from a second core network node, the GTP control plane message;
retrieving the priority information from a header of the GTP control plane message, wherein the priority information is denoted by at least one bit within a sequence number and retrieving the priority information further comprises retrieving from capability exchange procedure information an indication of which bit(s) and/or how many bits in the sequence number the priority information is comprised in; and
managing the GTP control plane message based on the retrieved priority information, wherein said managing further comprises further processing, dropping, buffering or rejecting the GTP control plane message.

10. The method of claim 9, further comprising sending, to the second network node, a second GTP control plane message to initiate a GTP transaction with the priority information provided in the at least one bit of the sequence number provided in the header of the GTP control plane message.

11. A first core network node for managing a General Packet Radio Service Tunneling Protocol, GTP, control plane message based on priority information, the first core network node comprising:
radio circuitry configured to receive, from a second core network node, the GTP control plane message;
processing circuitry configured to retrieve the priority information from a header of the GTP control plane message, wherein the priority information is denoted by at least one bit within a sequence number;
the processing circuitry is further configured to retrieve from capability exchange information an indication of which bit(s) and/or how many bits in the sequence number the priority information is comprised in; and
the processing circuitry further configured to process, drop, buffer or reject the GTP control plane message based on the retrieved priority information.

12. The first core network node of claim 11, wherein the radio circuitry is further configured to send, to the second network node, a second GTP control plane message to initiate a GTP transaction with the priority information provided in the at least one bit of the sequence number provided in the header of the GTP control plane message.

13. The first core network node of claim 11, wherein a flag is comprised in the received GTP control plane message, the flag indicating the presence of the priority information in the at least one bit of the sequence number.

* * * * *